US012572025B2

(12) United States Patent
Yang et al.

(10) Patent No.: US 12,572,025 B2
(45) Date of Patent: Mar. 10, 2026

(54) DISPLAY APPARATUS

(71) Applicant: Wuhan China Star Optoelectronics Technology Co., Ltd., Hubei (CN)

(72) Inventors: Huanli Yang, Hubei (CN); Rui He, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 359 days.

(21) Appl. No.: 18/275,010

(22) PCT Filed: May 25, 2023

(86) PCT No.: PCT/CN2023/096189

§ 371 (c)(1),
(2) Date: Jul. 30, 2023

(87) PCT Pub. No.: WO2024/221523

PCT Pub. Date: Oct. 31, 2024

(65) Prior Publication Data

US 2025/0085561 A1 Mar. 13, 2025

(30) Foreign Application Priority Data

Apr. 28, 2023 (CN) .......................... 202310486357.4

(51) Int. Cl.
*G02B 27/28* (2006.01)
*G02B 27/01* (2006.01)

(52) U.S. Cl.
CPC ....... *G02B 27/283* (2013.01); *G02B 27/0101* (2013.01)

(58) Field of Classification Search
CPC .... G02B 27/01–0189; G02B 2027/0105–0198
See application file for complete search history.

(56) References Cited

U.S. PATENT DOCUMENTS

| | | | |
|---|---|---|---|
| 10,768,442 B1 * | 9/2020 | Dehkordi | ........... G02B 27/0101 |
| 2017/0232336 A1 * | 8/2017 | Patel | ..................... A63F 13/212 |
| | | | 463/31 |
| 2019/0086675 A1 * | 3/2019 | Carollo | ................ G02B 27/288 |

FOREIGN PATENT DOCUMENTS

| | | |
|---|---|---|
| CN | 106199966 | 12/2016 |
| CN | 207924256 | 9/2018 |
| CN | 110161699 | 8/2019 |
| CN | 213690113 | 7/2021 |

(Continued)

OTHER PUBLICATIONS

International Search Report and the Written Opinion Dated Jan. 15, 2024 From the International Searching Authority Re. Application No. PCT/CN2023/096189 and Its Translation Into English. (18 Pages).

*Primary Examiner* — Christopher A Lamb, II

(57) ABSTRACT

The present application provides a display apparatus. The display apparatus includes an imaging assembly and a display panel. The imaging assembly is disposed on a light emitting side of the display panel. Disposing the light exiting surface of the display panel as a curved surface makes main light emitted from the display panel perpendicular to the display panel such that not only uniformity and light efficiency of image display brightness can be improved but also field curvature of the display apparatus can be corrected to make light emitting points of the display panel in different places able to clearly image images.

13 Claims, 5 Drawing Sheets

(56) References Cited

FOREIGN PATENT DOCUMENTS

| | | |
|---|---|---|
| CN | 113467091 | 10/2021 |
| CN | 114415380 | 4/2022 |
| CN | 217467353 | 9/2022 |
| CN | 115373149 | 11/2022 |
| CN | 115576103 | 1/2023 |
| WO | WO 2022/227540 | 11/2022 |

* cited by examiner

DISPLAY APPARATUS

RELATED APPLICATIONS

This application is a National Phase of PCT Patent Application No. PCT/CN2023/096189 having International filing date of May 25, 2023, which claims the benefit of priority of China Patent Application No. 202310486357.4 filed on Apr. 28, 2023. The contents of the above applications are all incorporated by reference as if fully set forth herein in their entirety.

FIELD OF INVENTION

The present invention relates to a field of display technologies, especially to a display apparatus.

BACKGROUND OF INVENTION

Virtual reality (VR) means projecting digitized content into the human eyes through an optical imaging system, allowing individuals to immerse themselves in a virtual world and achieve an immersive virtual experience. The key component in a VR display apparatus is the optical imaging system. The most crucial components of the optical imaging system include an imaging assembly and a display panel.

SUMMARY OF INVENTION

Main light angles at different positions of the display panel are typically 0°, which means the direction of maximum brightness is perpendicular to the surface of the display panel. However, the main light angles of the light beams entering the human's eyes through the imaging assembly at different viewing angles are often different. Moreover, at the near-edge position of the display panel (corresponding to the viewing angle of the human's eyes), the main light gradually deviates towards the optical axis direction. Due to the increasing emission angle of the display panel, there is more brightness attenuation resulting in uneven brightness of the displayed image. In other words, the brightness in the wide viewing angle is lower than the brightness in the central viewing angle, and it also reduces the display efficiency of the wide viewing angle. The imaging assembly may have various aberrations, one of which is field curvature. The cause of field curvature is that the off-axis light is farther away from the lens optical axis compared to the on-axis light. As a result, for most plane display panels, the image clarity varies from the center to the outer edges, becoming progressively blurry.

As described above, the conventional display apparatuses suffer from an issue of unclear imaging of light emission points at different positions. Therefore, it is necessary to provide a display apparatus to improve this deficiency.

The embodiment of the present application provides a display apparatus that can image a clear image at light emitting points of the display panel in different places while improving uniformity and light efficiency of image display brightness.

The embodiment of the present application provides a display apparatus, comprising an imaging assembly and a display panel, wherein the imaging assembly comprises an imaging lens group comprising at least one imaging lens, the imaging lens group is disposed on a light emitting side of the display panel, and an optical axis of the imaging lens group coincides with a central axis of a light exiting surface of the display panel;

wherein the light exiting surface of the display panel is a curved surface, main light emitted by the display panel is perpendicular to the light exiting surface of the display panel, and a minimum distance between a central point of the light exiting surface of the display panel and a central point of the imaging lens group ranges from 1 mm to 40 mm.

According to an embodiment of the present application, the imaging assembly comprises an imaging lens group comprising at least one imaging lens.

According to an embodiment of the present application, the imaging assembly comprises a first quarter wave plate, a beam splitter, a second quarter wave plate, and a polarization beam splitter arranged sequentially from the display panel on the light emitting side of the display panel.

According to an embodiment of the present application, at least one of the imaging lens of the imaging lens group is disposed between the beam splitter and the second quarter wave plate.

According to an embodiment of the present application, the display apparatus further comprises a polarizer, the polarizer is bonded to the light exiting surface of the display panel, and the first quarter wave plate is bonded to the polarizer.

According to an embodiment of the present application, the beam splitter is bonded to the first quarter wave plate.

According to an embodiment of the present application, the beam splitter is bonded to a lens surface of the imaging lens group having a closest distance from the display panel.

According to an embodiment of the present application, the imaging lens group comprises a first imaging lens and a second imaging lens, the second imaging lens is disposed on a side of the first imaging lens away from the display panel; and wherein the second quarter wave plate is bonded to a lens surface of the second imaging lens away from the first imaging lens, the polarization beam splitter is bonded to the second quarter wave plate.

According to an embodiment of the present application, the imaging lens group comprises a first imaging lens and a second imaging lens, the second imaging lens is disposed on a side of the first imaging lens away from the display panel; and wherein the polarization beam splitter is bonded to a lens surface of the second imaging lens near the first imaging lens, and the second quarter wave plate is bonded to the polarization beam splitter.

According to an embodiment of the present application, the first quarter wave plate, the beam splitter, the second quarter wave plate, and the polarization beam splitter are disposed between the imaging lens group and the display panel.

According to an embodiment of the present application, the display apparatus further comprises a polarizer bonded to the light exiting surface of the display panel, the first quarter wave plate is bonded to the polarizer, the beam splitter is bonded to the first quarter wave plate, and the second quarter wave plate is bonded to the beam splitter.

According to an embodiment of the present application, the display apparatus further comprises a polarizer bonded to the light exiting surface of the display panel, wherein the first quarter wave plate is bonded to the polarizer, the beam splitter is bonded to the first quarter wave plate, and the second quarter wave plate is bonded to the polarization beam splitter.

According to an embodiment of the present application, a minimum distance between the central point of the light exiting surface of the display panel and the central point of the imaging lens group ranges from 1 mm to 25 mm.

According to an embodiment of the present application, the beam splitter is a transflective film.

According to an embodiment of the present application, the beam splitter is a beam splitter film.

According to an embodiment of the present application, the polarization beam splitter is a reflective polarization film.

According to an embodiment of the present application, the polarization beam splitter is a metal wire grid.

According to an embodiment of the present application, the imaging lens is any one of plano-convex lens, biconvex lens, biconcave lens, plano-concave lens, and meniscus lens.

According to an embodiment of the present application, a bending dimension of the light exiting surface of the display panel is horizontal one-dimensional, vertical one-dimensional, horizontal two-dimensional, vertical two-dimensional, or 360-degree symmetrical bending.

According to an embodiment of the present application, the display apparatus further comprises a display panel bracket and a lens barrel, the display panel is installed on the display panel bracket, the display panel bracket is installed at an end of the lens barrel, and the imaging assembly is installed at another end of the lens barrel and is located on the light emitting side of the display panel.

Advantages

Advantages of the embodiments of the present disclosure: The embodiment of the present application provides a display apparatus, the display apparatus comprises an imaging assembly and a display panel. The imaging assembly comprises an imaging lens group, the imaging lens group comprises at least one imaging lens, and the imaging lens group is disposed on the light emitting side of the display panel. Disposing the light exiting surface of the display panel as a curved surface makes main light emitted from the display panel perpendicular to the display panel such that not only uniformity and light efficiency of image display brightness can be improved but also field curvature of the display apparatus can be corrected to make light emitting points of the display panel in different places able to clearly image images.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

DETAILED DESCRIPTION OF PREFERRED EMBODIMENTS

Figure 1:
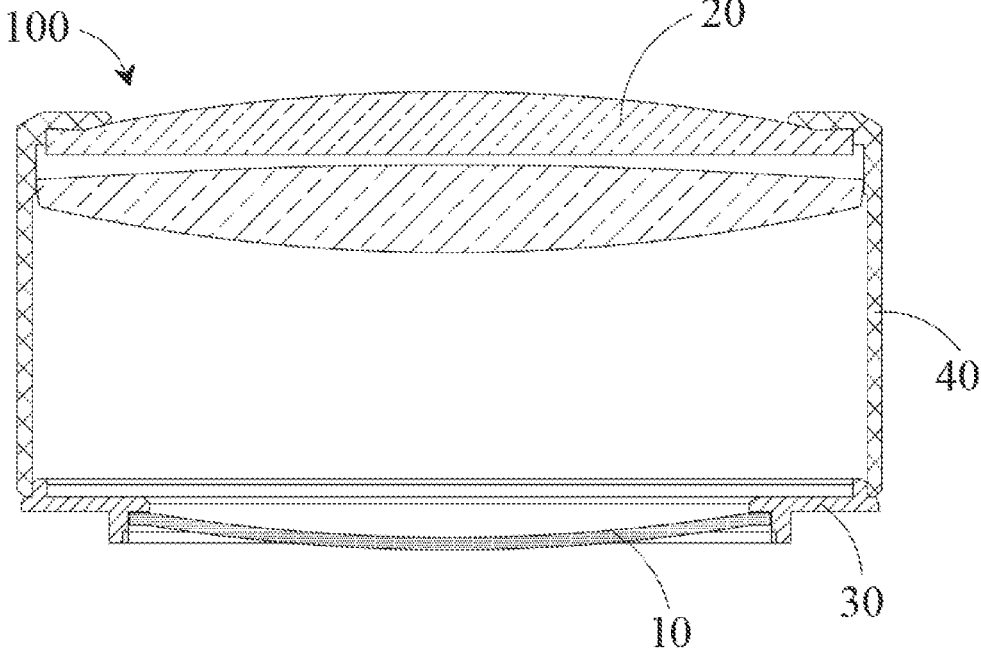
FIG. 1 is a schematic structural view of a display apparatus provided by an embodiment of the present application.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

Attached drawings and specific embodiments are combined as follows to further describe the present disclosure.

The embodiment of the present application provides a display apparatus, and the display apparatus comprises an imaging assembly and a display panel. The imaging assembly comprises an imaging lens group comprising at least one imaging lens, and the imaging lens group is disposed on a light emitting side of the display panel. An optical axis of the imaging lens group coincides with a central axis of the light exiting surface of the display panel. A minimum distance between a central point of the light exiting surface of the display panel and a central point of the imaging lens group ranges from 1 mm to 40 mm. Disposing the light exiting surface of the display panel as a curved surface makes main light emitted from the display panel perpendicular to the display panel such that not only uniformity and light efficiency of image display brightness can be improved but also field curvature of the display apparatus can be corrected to make light emitting points of the display panel in different places able to clearly image images.

With reference to FIG. 1, FIG. 1 is a schematic structural view of a display apparatus provided by an embodiment of the present application. The display apparatus 100 comprises an optical imaging system, and the optical imaging system comprises a display panel 10, an imaging assembly 20, a display panel bracket 30, and a lens barrel 40. The display panel 10 is installed on the display panel bracket 30. The lens barrel 40 is a hollow structure. The display panel bracket 30 is installed at one end of the lens barrel 40. The imaging assembly 20 is installed on another opposite end of the lens barrel 40 and is located on the light emitting side of the display panel 10.

In the embodiment of the present application, a light exiting surface 10a of the display panel 10 is a curved surface. A bending dimension of the light exiting surface 10a of the display panel 10 can be horizontal one-dimensional, vertical one-dimensional, horizontal two-dimensional, vertical two-dimensional, or 360-degree symmetrical bending, and here gives no limit.

In one of the embodiments, the imaging assembly comprises an imaging lens group comprising at least one imaging lens.

It should be explained that an imaging lens is an optical element made of a transparent substance. The material of the imaging lens can be glass or optical resin. Optical resin is an organic compound that is easy to injection mold or compression mold, has good light transmittance, and is less prone to breakage. Glass lenses can also be referred to as phase-independent imaging lenses, while optical resin lenses can be referred to as phase-dependent imaging lenses. Phase-independent imaging lenses refer to lenses where light passing through the device does not introduce a phase difference for different polarization directions, or it can be understood as the device having no birefringence effect. Phase-dependent imaging lenses, on the other hand, cause a change in polarization characteristics when passing through the device, resulting in stray light or ghosting. The device exhibits a birefringence effect, which reduces imaging clarity. For example, linearly polarized light transmitted through the lens becomes elliptically polarized light, and circularly polarized light transmitted through the lens becomes elliptically polarized light. Typically, glass lenses are used in optical imaging systems.

Figure 2:
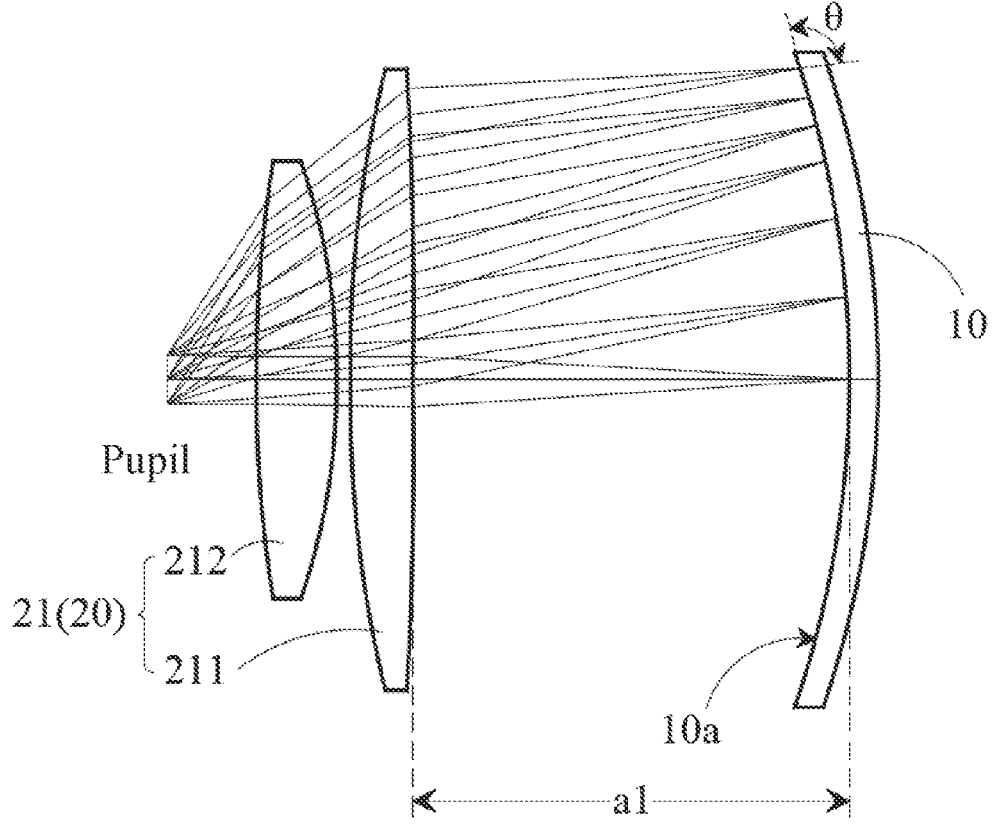
FIG. 2 is a schematic structural view of an optical imaging system provided by a first embodiment of the present application.

With reference to FIG. 2, FIG. 2 is a schematic structural view of an optical imaging system provided by a first embodiment of the present application. The imaging assembly 20 comprises an imaging lens group 21. The imaging lens group 21 is disposed on the light emitting side of the display panel 10. The imaging lens group 21 comprises two imaging lenses which are first imaging lens 211 and second imaging lens 212. The second imaging lens 212 is disposed on a side of the first imaging lens 211 away from the display panel 10.

In the present embodiment, both the first imaging lens 211 and the second imaging lens 212 are biconvex lenses, namely, lens surfaces of the first imaging lens 211 near and away from the display panel 10 are convex curved surfaces, and lens surfaces of the second imaging lens 212 near and away from the display panel 10 are convex curved surfaces.

In some other embodiments, a shape of the imaging lens can be one of plano-convex lens, biconvex lens, biconcave lens, plano-concave lens, and meniscus lens. The shapes of the individual imaging lenses in the imaging lens group 21 can be the same or different. No exclusive limitation is imposed here.

In the present embodiment, the light exiting surface 10*a* of the display panel 10 is a curved surface. The main light emitted from different positions on the display panel 10 corresponding to the imaging lens group 21 forms an included angle θ=90° with the position of the light exiting surface of the display panel 10, which is perpendicular to it. In this structure, it not only enhances the uniformity of the display apparatus and the light efficiency of image display brightness but also helps correct the field curvature of the entire optical imaging system, ensuring clear imaging of light-emitting points on the display panel in different locations.

Furthermore, a minimum distance between the central point of the light exiting surface 10*a* of the display panel 10 and the central point of the first imaging lens 211 ranges from 25 mm to 45 mm.

With reference to FIG. 2, the minimum distance between the central point of the light exiting surface 10*a* of the display panel 10 and the central point of the first imaging lens 211 is a1, and a1 ranges from 25 mm to 45 mm. For example, a1 can be, but is not limited to, any value among 26 mm, 28 mm, 30 mm, 35 mm, 38 mm, 41 mm, or 45 mm.

Preferably, the minimum distance between the central point of the light exiting surface 10*a* of the display panel 10 and the central point of the first imaging lens 211 ranges from 30 mm to 45 mm.

It should be explained that FIG. 2 in the embodiment of the present application is only schematic, illustrating the relative positional relationship between the imaging lens group 21 and the display panel 10 in the imaging assembly 20. It does not represent the actual quantity or type of imaging lenses in the imaging lens group 21 in practical applications. In practical applications, the imaging lens group 21 can include one lens. Furthermore, in order to further improve image clarity, aberration compensation can be achieved by increasing the number of imaging lenses in the imaging lens group 21 to enhance imaging clarity.

The imaging lens in the imaging lens group 21 can be selected from any of the following: ordinary spherical lens, aspherical lens, Fresnel lens, micro lens array, holographic film, or liquid crystal lens. Fresnel lens, micro lens array, and holographic optical film can be planar or curved to match the curved surface light exiting surface of the display panel 10. The imaging lens group 21 can be selected from any combination of ordinary spherical lens group, aspherical lens group, Fresnel lens group, micro lens array, and holographic optical film, and there is no specific limitation on the selection.

In one of the embodiments, the imaging assembly comprises a first quarter wave plate, a second quarter wave plate, a beam splitter, and a polarization beam splitter. The first quarter wave plate, the beam splitter, the second quarter wave plate, and the polarization beam splitter are arranged sequentially from the display panel on the light emitting side of the display panel.

The first quarter wave plate and the second quarter wave plate can also be referred to as 45 degrees phase retardation plates. Both the first quarter wave plate and the second quarter wave plate can be made of birefringence material. When the optical vector of linearly polarized light is at ±45° to the fast or slow axis of the first quarter wave plate or the second quarter wave plate, the light passing through them becomes circularly polarized light. Conversely, when circularly polarized light passes through the first quarter wave plate or the second quarter wave plate, it becomes linearly polarized light.

The beam splitter is a type of film known as a transflective film or a beam splitter film. The transflective film allows incident light to partially pass through and partially reflect. For example, it is a film with both transmittance and reflectivity of 50%. Transmittance refers to the phenomenon of light passing through an object after refraction. The transmitted object can be transparent or semi-transparent, such as glass or a color filter. If the transparent object is colorless, most of the light passes through the object except for a few reflections. To indicate the degree to which light passes through an object, transmittance is typically represented by the ratio of the intensity of transmitted light to the intensity of incident light after passing through the film. Reflectivity represents the ratio of the intensity of light reflected back to the intensity of incident light.

The polarization beam splitter is a reflective polarization film or metal wire grid.

Figure 3:
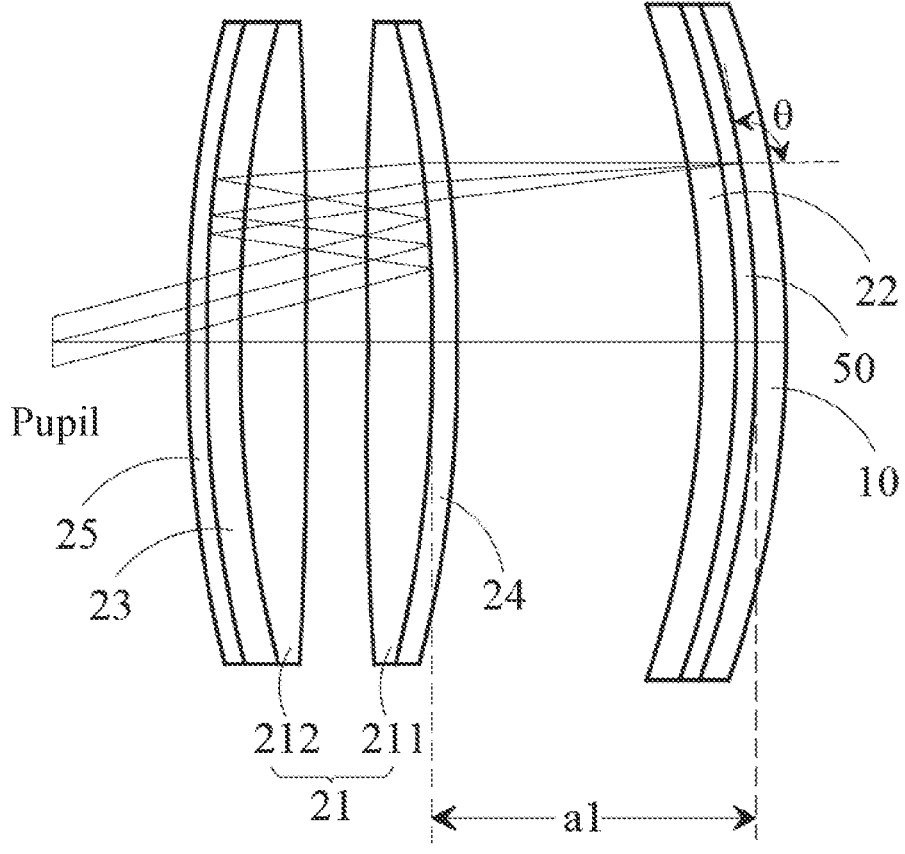
FIG. 3 is a schematic structural view of the optical imaging system provided by a second embodiment of the present application.

With reference to FIG. 3, FIG. 3 is a schematic structural view of the optical imaging system provided by a second embodiment of the present application. The imaging assembly 20 comprises a first quarter wave plate 22, a second quarter wave plate 23, a beam splitter 24, and a polarization beam splitter 25. The first quarter wave plate 22, the beam splitter 24, the second quarter wave plate 23, and the polarization beam splitter 25 are arranged sequentially on the light emitting side of the display panel 10 according to a sequential order from a closest distance to a farthest distance from the display panel 10. The first quarter wave plate 22 has a closest distance from the light exiting surface of the display panel 10, the polarization beam splitter 25 has a farthest distance from the light exiting surface of the display panel 10. The beam splitter 24 is a transflective film, and the polarization beam splitter 25 is a reflective polarization film.

Furthermore, the imaging assembly comprises an imaging lens group, imaging lens group comprises at least one imaging lens, and at least one imaging lens in the imaging lens group is disposed between the beam splitter and the second quarter wave plate.

With reference to FIG. 3, the imaging assembly 20 comprises an imaging lens group 21, the imaging lens group 21 comprises a first imaging lens 211 and a second imaging lens 212. The first imaging lens 211 and the second imaging lens 212 are both disposed between the beam splitter 24 and the second quarter wave plate 23.

Furthermore, display apparatus 100 further comprises a polarizer 50, and the polarizer 50 is bonded to the light exiting surface of the display panel 10. The polarizer 50 can be a general optical polarization film, and can also be a liquid crystal thin film or holographic optical element.

In one of the embodiments, with reference to FIG. 3, the first quarter wave plate 22 is bonded to the polarizer 50, and the beam splitter 24 is bonded to the lens surface of the first imaging lens 211 near the display panel 10. The lens surface of the first imaging lens 211 near the display panel 10 is a lens surface in the imaging lens group 21 having a closest distance from the display panel 10. The second quarter wave plate 23 is bonded to a lens surface of the second imaging lens 212 away from the first imaging lens 211. The polarization beam splitter 25 is bonded to the second quarter wave plate 23.

The first quarter wave plate 22, the beam splitter 24, the second quarter wave plate 23, and the polarization beam splitter 25 can be configured to fold a light path and emit polarized light. In this structure, not only the effective optical path can be greater than the physical distance, thereby reducing the distance between the imaging assembly 20 and the display panel 10, but it can also enhance light efficiency and edge visual field resolution.

A light path of FIG. 3 is that: The polarizer 50 converts the non-polarized light emitted from the display panel 10 into first polarized light, where the first polarized light is linearly polarized light. The first quarter wave plate 22 converts the first polarized light emitted from the polarizer 50 into first circularly polarized light. The beam splitter 24 transmits a portion of the first circularly polarized light emitted from the first quarter wave plate 22. The first imaging lens 211 and the second imaging lens 212 sequentially transmit the first circularly polarized light at the emission point of the beam splitter 24. The second quarter wave plate 23 converts a portion of the first circularly polarized light emitted from the imaging lens group 21 into second polarized light. The polarization beam splitter 25 reflects the second polarized light emitted from the second quarter wave plate 23. The second quarter wave plate 23 converts the second polarized light reflected by the polarization beam splitter 25 into second circularly polarized light. The imaging lens group 21 transmits the second circularly polarized light emitted from the second quarter wave plate 23. The beam splitter 24 reflects a portion of the second circularly polarized light emitted from the second quarter wave plate 23. The imaging lens group 21 transmits a portion of the second circularly polarized light emitted from the beam splitter 24. The second quarter wave plate 23 converts a portion of the second circularly polarized light emitted from the imaging lens group 21 into first polarized light. The polarization beam splitter 25 transmits the first polarized light emitted from the second quarter wave plate 23, ultimately forming an image at the pupil.

Furthermore, in the embodiment of FIG. 3, a minimum distance between a central point of the light exiting surface of the display panel 10 and a central point of the imaging lens group 21 ranges from 1 mm to 25 mm. The folding light path formed in the first quarter wave plate 22, the beam splitter 24, the second quarter wave plate 23, and the polarization beam splitter 25 in the imaging assembly can reflect light in multiple times such that the distance between the imaging lens group 21 and the display panel 10 can be reduced to achieve technical effects of compactness, high light efficiency, and high resolution.

With reference to FIG. 3, the minimum distance between the central point of the light exiting surface 10$a$ of the display panel 10 and the central point of the imaging lens group 21 is the distance a1 between the central point of the light exiting surface 10$a$ of the display panel 10 and the central point of the first imaging lens 211. a1 should be greater than or equal to 1 mm and be less than or equal to 25 mm. For example, a1 can be, but is not limited to, any one of 1 mm, 5 mm, 10 mm, 15 mm, 20 mm or 25 mm.

Figure 4:
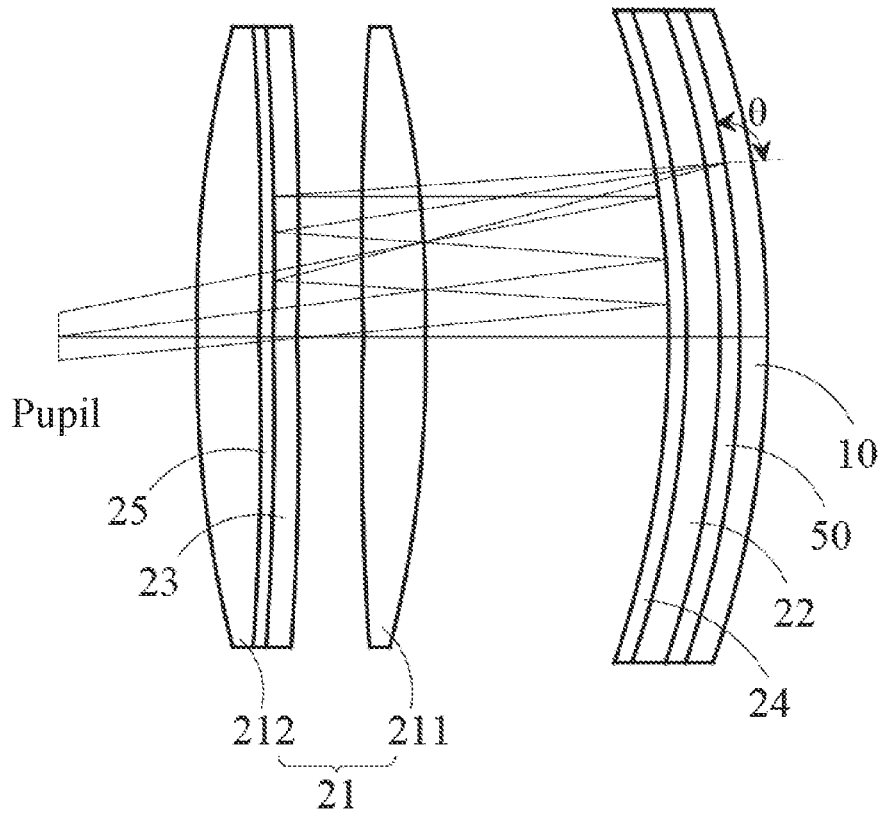
FIG. 4 is a schematic structural view of the optical imaging system provided by a third embodiment of the present application.

With reference to FIG. 4, FIG. 4 is a schematic structural view of the optical imaging system provided by a third embodiment of the present application. structure of FIG. 4 is substantially the same as the structure of the optical imaging system of the second embodiment of FIG. 3, and a difference thereof is that: The beam splitter 24 is bonded to the first quarter wave plate 22. The polarization beam splitter 25 is bonded to a lens surface of the second imaging lens 212 near the first imaging lens 211. The second quarter wave plate 23 is bonded to the polarization beam splitter 25.

A light path of FIG. 4 is that: The polarizer 50 converts the non-polarized light emitted from the display panel 10 into first polarized light, where the first polarized light is linearly polarized light. The first quarter wave plate 22 converts the first polarized light emitted from the polarizer 50 into first circularly polarized light. The beam splitter 24 transmits a portion of the first circularly polarized light emitted from the first quarter wave plate 22. The first imaging lens 211 transmits the first circularly polarized light at the emission point of the beam splitter 24. The second quarter wave plate 23 converts a portion of the first circularly polarized light emitted from the imaging lens group 21 into second polarized light. The polarization beam splitter 25 reflects the second polarized light emitted from the second quarter wave plate 23. The second quarter wave plate 23 converts the second polarized light reflected by the polarization beam splitter 25 into second circularly polarized light. The first imaging lens 211 transmits the second circularly polarized light emitted from the second quarter wave plate 23. The beam splitter 24 reflects a portion of the second circularly polarized light emitted from the second quarter wave plate 23. The first imaging lens 211 transmits a portion of the second circularly polarized light emitted from the beam splitter 24. The second quarter wave plate 23 converts a portion of the second circularly polarized light emitted from the first imaging lens 211 into first polarized light. The polarization beam splitter 25 transmits the first polarized light emitted from the second quarter wave plate 23. The second imaging lens 212 transmits the first polarized light transmitted through the polarization beam splitter 25, ultimately forming an image at the pupil.

Figure 5:
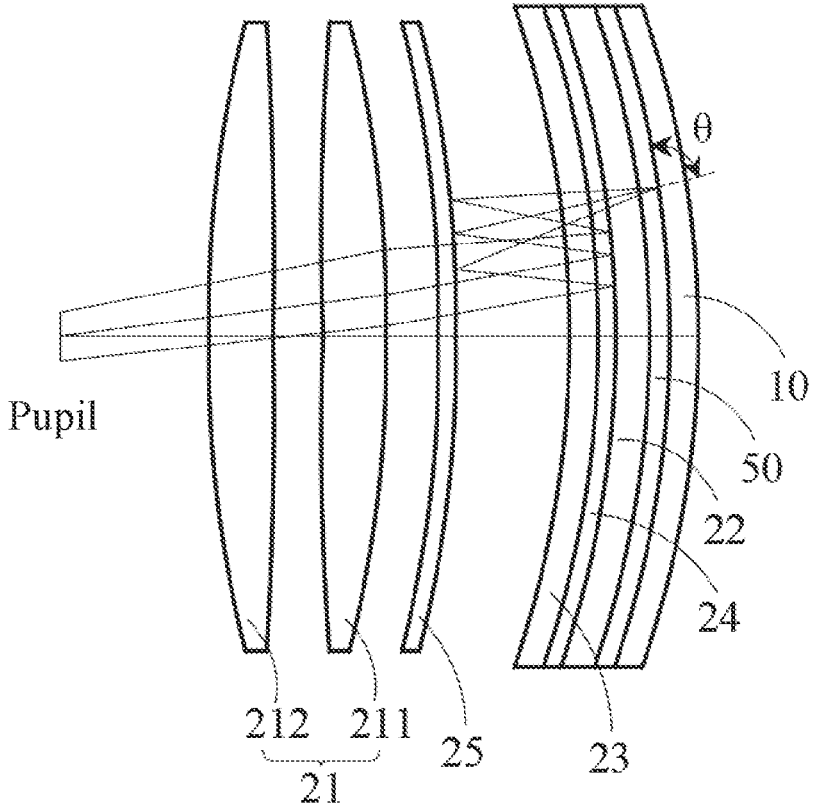
FIG. 5 is a schematic structural view of the optical imaging system provided by a fourth embodiment of the present application.

With reference to FIG. 5, FIG. 5 is a schematic structural view of the optical imaging system provided by a fourth embodiment of the present application. A structure of FIG.

3 is substantially the same as the structure of the optical imaging system of the second embodiment of FIG. 3, and a difference thereof is that: The first quarter wave plate 22, the beam splitter 24, the second quarter wave plate 23, and the polarization beam splitter 25 are all disposed between the imaging lens group 21 and the display panel 10. The polarizer 50 is bonded to the light exiting surface of the display panel 10. The first quarter wave plate 22 is bonded to the polarizer 50. The beam splitter 24 is bonded to the first quarter wave plate 22. The second quarter wave plate 23 is bonded to the beam splitter 24 or the polarization beam splitter 25.

In one of the embodiments, with reference to FIG. 5, the second quarter wave plate 23, the beam splitter 24, the first quarter wave plate 22, the polarizer 50, and the display panel 10 are bonded sequentially. The polarization beam splitter 25 is disposed between the imaging lens group 21 and the second quarter wave plate 23 and is disposed at intervals from the imaging lens group 21 and the second quarter wave plate 23 respectively.

A light path of FIG. 5 is that: The polarizer 50 converts the non-polarized light emitted from the display panel 10 into first polarized light, where the first polarized light is linearly polarized light. The first quarter wave plate 22 converts the first polarized light emitted from the polarizer 50 into first circularly polarized light. The beam splitter 24 transmits a portion of the first circularly polarized light emitted from the first quarter wave plate 22. The second quarter wave plate 23 converts the portion of first circularly polarized light transmitted through the beam splitter 24 into second polarized light. The polarization beam splitter 25 reflects the second polarized light emitted from the second quarter wave plate 23. The second quarter wave plate 23 converts the second polarized light reflected by the polarization beam splitter 25 into second circularly polarized light. The beam splitter 24 reflects a portion of the second circularly polarized light emitted from the second quarter wave plate 23. The second quarter wave plate 23 converts the portion of second circularly polarized light reflected by the beam splitter 24 into first polarized light. The polarization beam splitter 25 transmits the first polarized light emitted from the second quarter wave plate 23. The first imaging lens 211 and the second imaging lens 212 sequentially transmit the first polarized light transmitted through the polarization beam splitter 25, ultimately forming an image at the pupil.

In one of the embodiments, a structure of the optical imaging system is substantially the same as the structure of the optical imaging system of FIG. 5, and a difference thereof is that: the polarization beam splitter 25 can be bonded to a lens surface of any one of the imaging lenses of the imaging lens group 21 away from or near the display panel 10, which can also achieve a similar technical effect as the above fourth embodiment, and no description is repeated here.

In one of the embodiments, a structure of the optical imaging system is substantially the same as the structure of the optical imaging system of FIG. 5, and a difference thereof is that: The beam splitter 24, the first quarter wave plate 22, the polarizer 50. and the display panel 10 are bonded sequentially. The polarization beam splitter 25 is bonded to the second quarter wave plate 23 and is disposed at an interval from the imaging lens group 21 and the second quarter wave plate 23 respectively.

Advantages of the embodiment of the present application: The embodiment of the present application provides a display apparatus, the display apparatus comprises an imaging assembly and a display panel, and the imaging assembly is disposed on the light emitting side of the display panel. Disposing the light exiting surface of the display panel as a curved surface makes main light emitted from the display panel perpendicular to the display panel such that not only uniformity and light efficiency of image display brightness can be improved but also field curvature of the display apparatus can be corrected to make light emitting points of the display panel in different places able to clearly image images.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A display apparatus, comprising an imaging assembly and a display panel, wherein the imaging assembly comprises an imaging lens group that comprises at least one imaging lens, and is disposed on a light emitting side of the display panel, and an optical axis of the imaging lens group coincides with a central axis of a light exiting surface of the display panel;

wherein the light exiting surface of the display panel is a curved surface, main light emitted by the display panel is perpendicular to the light exiting surface of the display panel, and a minimum distance between a central point of the light exiting surface of the display panel and a central point of the imaging lens group ranges from 1 mm to 40 mm;

wherein the imaging assembly comprises a first quarter wave plate, a beam splitter, a second quarter wave plate, and a polarization beam splitter arranged sequentially from the display panel on the light emitting side of the display panel;

wherein the at least one imaging lens of the imaging lens group is disposed between the beam splitter and the second quarter wave plate;

wherein the display apparatus further comprises a polarizer, the polarizer is bonded to the light exiting surface of the display panel, and the first quarter wave plate is bonded to the polarizer;

wherein the imaging lens group comprises a first imaging lens and a second imaging lens, the second imaging lens is disposed on a side of the first imaging lens away from the display panel;

wherein the second quarter wave plate is bonded to a lens surface of the second imaging lens away from the first imaging lens, the polarization beam splitter is bonded to the second quarter wave plate;

wherein the first imaging lens and the second imaging lens are disposed between the beam splitter and the second quarter wave plate.

2. The display apparatus according to claim 1, wherein the imaging lens group comprises a first imaging lens and a second imaging lens disposed on a side of the first imaging lens away from the display panel;

wherein a minimum distance between the central point of the light exiting surface of the display panel and a central point of the first imaging lens ranges between 25 mm and 45 mm.

3. The display apparatus according to claim 1, wherein the beam splitter is bonded to the first quarter wave plate.

4. The display apparatus according to claim 1, wherein the beam splitter is bonded to a lens surface of the imaging lens group having a closest distance from the display panel.

5. The display apparatus according to claim 1, wherein the first quarter wave plate, the beam splitter, the second quarter wave plate, and the polarization beam splitter are disposed between the imaging lens group and the display panel.

6. The display apparatus according to claim 1, wherein a minimum distance between the central point of the light exiting surface of the display panel and the central point of the imaging lens group ranges from 1 mm to 25 mm.

7. The display apparatus according to claim 1, wherein the beam splitter is a transflective film.

8. The display apparatus according to claim 1, wherein the beam splitter is a beam splitter film.

9. The display apparatus according to claim 1, wherein the polarization beam splitter is a reflective polarization film.

10. The display apparatus according to claim 1, wherein the polarization beam splitter is a metal wire grid.

11. The display apparatus according to claim 1, wherein the imaging lens is one of plano-convex lens, biconvex lens, biconcave lens, plano-concave lens, and meniscus lens.

12. The display apparatus according to claim 1, wherein a bending dimension of the light exiting surface of the display panel is horizontal one- dimensional, vertical one-dimensional, horizontal two-dimensional, vertical two-dimensional, or 360-degree symmetrical bending.

13. The display apparatus according to claim 1, further comprising a display panel bracket and a lens barrel, wherein the display panel is installed on the display panel bracket, the display panel bracket is installed at an end of the lens barrel, and the imaging assembly is installed at another end of the lens barrel and is located on the light emitting side of the display panel.

\* \* \* \* \*